United States Patent [19]

Morrell et al.

[11] 3,892,996

[45] July 1, 1975

[54] SELF-CONVERGING COLOR TELEVISION DISPLAY SYSTEM

[75] Inventors: Albert Maxwell Morrell, Lancaster, Pa.; William Henry Barkow, Pennsauken; Josef Gross, Princeton, both of N.J.

[73] Assignee: RCA Corporation, New York, N.Y.

[22] Filed: June 29, 1973

[21] Appl. No.: 374,831

Related U.S. Application Data

[63] Continuation of Ser. No. 217,780, Jan. 14, 1972, abandoned.

[52] U.S. Cl. .................................. 313/413; 313/415

[51] Int. Cl. ... H01j 29/66; H01j 29/76; H01j 31/20

[58] Field of Search .................................. 313/70 C

[56] References Cited

UNITED STATES PATENTS

| | | | |
|---|---|---|---|
| 3,548,249 | 12/1970 | Yoshida et al. | 313/70 C |
| 3,594,600 | 7/1971 | Murata et al. | 313/70 C X |
| 3,721,930 | 3/1973 | Barkow et al. | 335/213 |
| 3,733,507 | 5/1973 | Casset et al. | 313/70 C |
| 3,772,554 | 11/1973 | Hughes | 313/412 |

*Primary Examiner*—Robert Segal
*Attorney, Agent, or Firm*—Eugene M. Whitacre; Paul J. Rasmussen

[57] ABSTRACT

A color television display system is described which requires no dynamic convergence apparatus for small and medium size screen color picture tubes and which requires relatively simple dynamic convergence apparatus for large screen color picture tubes. The color picture tube includes an electron gun assembly for producing three adjacent coplanar beams having a predetermined maximum spacing therebetween. The electron gun assembly includes a common three-aperture beam forming electrode for establishing precise alignment of the beams. The beams are substantially converged at all points in the scanned raster as they are deflected by a deflection yoke providing negative horizontal isotropic astigmatism and positive vertical isotropic astigmatism. The gun assembly includes magnetic shield members disposed around the two outside beam paths to shield those beams from a portion of the deflection field so that the raster scanned by the three beams are the same size. In addition, the color picture tube includes a faceplate having repeating groups of three different color phosphor strips and an aperture mask including a plurality of elongated slit apertures disposed adjacent the phosphor strips to enhance the light output from the picture tube.

20 Claims, 7 Drawing Figures

SELF-CONVERGING COLOR TELEVISION DISPLAY SYSTEM

This is a continuation, of application Ser. No. 217,780, filed Jan. 14, 1972, now abandoned.

BACKGROUND OF THE INVENTION

This invention relates to color television display systems in which a plurality of electron beams are substantially converged at all points on a scanned raster without the use of dynamic convergence apparatus.

Most color television receivers in use today utilize a cathode ray tube in which a plurality of electron beams generated by an electron gun assembly disposed within the tube at one end are directed toward a viewing screen containing a plurality of different color phosphor elements disposed within the other end of the tube. An aperture mask or other color selecting means such an aperture grill or a focus grill is disposed between the viewing screen and the gun assembly to screen the electron beams such that portions of each beam land only on their respective color phosphor elements. A deflection yoke disposed around the outside of the cathode ray tube is energized to provide a magnetic field for deflecting the beams horizontally and vertically to form a scanned raster on the viewing screen. Such a basic display system is supplemented by additional apparatus for providing dynamic convergence correction. One requirement of the display system is that the beams converge at all points on the scanned raster. The effect of misconvergence is an undersirable fringe of color appearings at the edge of objects in a televised scene. Misconvergence may be measured as a separation of the ideally superimposed red, green and blue lines of a crosshatch pattern of lines appearing on the raster as an appropriate test signal is applied to the receiver.

It is common practice to converge the beams statically at the center of the raster by means such as permanent magnets disposed around the neck of the picture tube in a predetermined relationship to the beams. The beams do not stay converged as they are deflected from the center of the raster because the viewing screen is relatively flat and the distance between the viewing screen and the deflection center of the yoke increases as the beams are deflected from the screen center. Furthermore, the yoke aberrations such as image field curvature, astigmatism and coma cause additional convergence errors. It is common practice to provide apparatus to dynamically converge the beams as they are scanned over the raster. Picture tubes having an electron gun assembly of the delta type in which three electron guns are disposed at the apices of an equilateral triangle usually employ an electromagnetic convergence assembly in which electromagnets disposed outside of the tube energize magnetic pole pieces within the tube neck to move the beams in a radial direction. The electromagnets are energized by waveforms at the horizontal and vertical scanning rates to provide the time varying convergence fields as the beams are scanned. Additionally, sometimes it is necessary to combine waveforms at the horizontal and vertical scanning rates such as horizontal rate waveforms modulated at vertical rate waveforms and apply the resultant waveforms to the convergence electromagnets or to the deflection yoke windings to improve convergence of the beams in the corners of the raster.

Color television receivers have heretofore been proposed which include color picture tubes having an electron gun assembly producing three coplanar or in-line beams, usually disposed in a horizontal line. The beams must still be converged. To this end, it is known that the beams may be dynamically converged in a horizontal direction by applying suitable horizontal or vertical scanning rate waveforms to electromagnetic or electrostatic convergence apparatus. A system has been described in which the beams are converged by means of the deflecting yoke. However, when the yoke is designed for this purpose the effects of other yoke aberrations such as coma must be corrected. The apparatus utilized for dynamic coma correction offsets the cost saving achieved by eliminating the horizontal dynamic convergence apparatus.

It is known that the undesirable effects of coma and misconvergence can be reduced by reducing the distance between the in-line beams at the deflection plane of the yoke. This can be accomplished by reducing the distance between adjacent beam forming elements of the electron gun assembly. The closer the in-line beams are at the deflection plane the lower must be the transmission of the aperture mask to electron beams to maintain screen tolerance between the fluorescent spots and the phsophor elements printed on the viewing screen. As the mask transmission is reduced, the light output of the picture tube is reduced. It follows that even if proper convergence and an acceptable amount of coma can be produced by a system utilizing in-line electron beams with relatively small separation, the end result is unacceptable if the picture is not bright enough for comfortable viewing under normal viewing conditions.

It is an object of the invention to provide a color television display system which eliminates the need for dynamic convergence and coma correction apparatus and which produces a picture having commercially acceptable brightness.

A color television display system embodying the invention includes a color television picture tube having an electron beam gun assembly for producing three in-line beams, an aperture mask for screening the beams and a plurality of different color phosphor elements deposited on a viewing screen. The electron gun assemly is selected for providing a predetermined maximum spacing between adjacent beams at the yoke deflection plane. A deflection yoke is mounted around the outside of the picture tube for causing the beams to scan a raster on the viewing screen. The deflecting windings of the yoke are selected for producing negative horizontal isotropic astigmatism and positive vertical isotropic astigmatism.

In one embodiment of the invention the viewing screen of the picture tube is comprised of repeating groups of three adjacent different color phosphor strips. The aperture mask utilized with this viewing screen comprises a plurality of slit apertures extending collinearly with the phosphor strips to allow more electrons to excite the respective phosphor strips for producing more light output.

In one embodiment the electron gun assembly includes at least one common beam forming electrode containing three apertures for producing alignment of the three beams.

In another embodiment the electron gun assembly includes magnetic shield members disposed around the paths of the two outside ones of the three electron beams for shielding them from a portion of the deflection field.

A more detailed description of the invention is given in the following specification and accompanying drawings of which:

DESCRIPTION OF A PREFERRED EMBODIMENT OF THE INVENTION

Figures 1, 2:
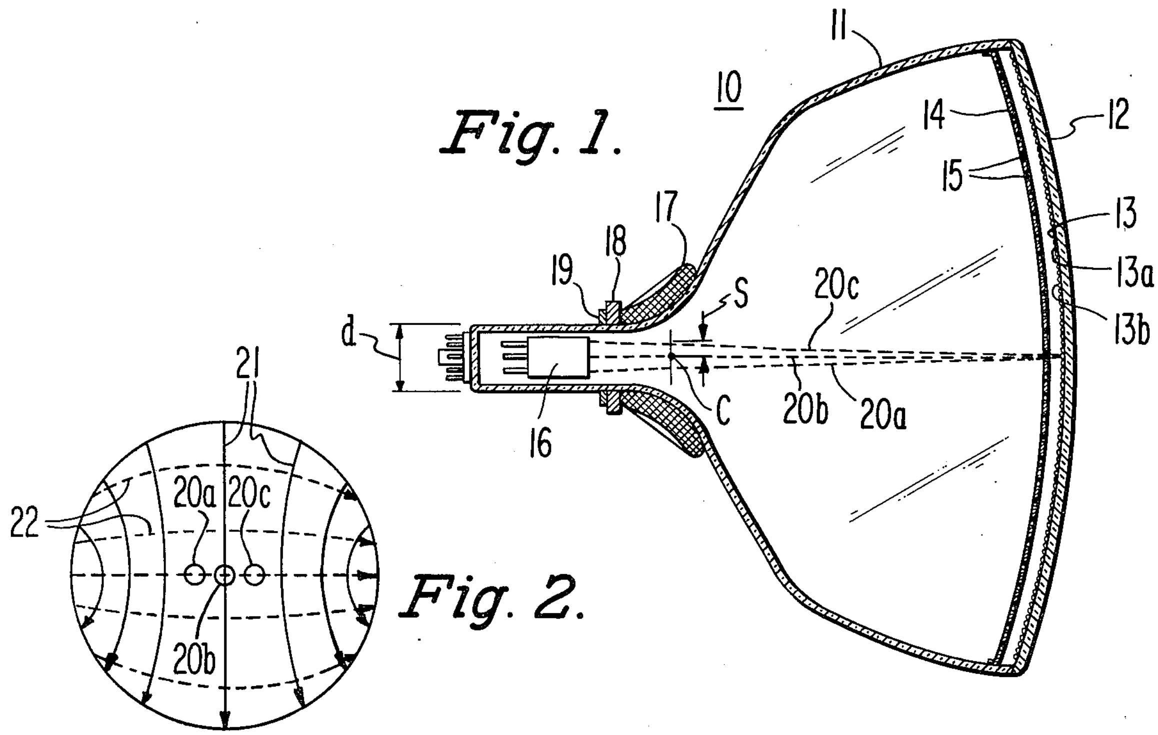
FIG. 1 is a top view in longitudinal crosssection of a color television display system according to the invention.
FIG. 2 is an illustration of the net magnetic deflection field produced by the deflection yoke illustrated in FIG. 1

FIG. 1 is a top view in longitudinal crosssection of a color television display system according to the invention. A color television picture tube 10 includes an evacuated glass envelope 11. The front portion of the envelope 11 is a viewing screen and faceplate 12 on the inside of which is deposited a plurality of red, green and blue phosphor elements 13, 13*a* and 13*b*. Disposed within the tube adjacent the phosphor elements is an aperture mask 14 including a plurality of apertures 15. The apertures 15 are so registered with relation to the phosphor elements that they serve to screen the electron beams such that portions of the electron beams passed by the apertures 15 impinge only on their respective color phosphor elements. Within the other end of glass envelope 11 is an electron beam gun assembly 16 for producing three coplanar or in-line electron beams. Electron gun assembly 16 is constructed such that the two outside electron beams are converged on the center beams at a centrally located point on the viewing screen. A more detailed description of electron gun assembly 16 will be given subsequently in conjunction with FIG. 5.

Disposed around the outside of glass envelope 11 along a flared portion thereof is a deflection yoke 17 adapted to be energized by suitable sources of scanning currents, not shown, for producing a magnetic field which will deflect the electron beams to form a scanned raster on the viewing screen. A more detailed description of the deflection yoke 17 will be given in conjunction with FIGS. 3 and 4.

Disposed behind the deflection yoke 17 on the neck portion of glass envelope 11 is a static convergence assembly 18. Static convergence assembly 18 includes magnets whose positions are adjustable such that they compensate for any error in beam alignment and cause the beams to converge at a point in the center of the viewing screen when the beams are not deflected. A suitable static convergence assembly for use with an inline electon gun assembly is disclosed in copending application Ser. No. 217,757 filed concurrently herewith for Robert L. Barbin and entitled "Magnetic Beam Adjusting Arrangements." Disposed behind the beam convergence assembly 18 is a beam purity device 19 of conventional design which serves the purpose of causing the beams to land on their respective color phosphor elements.

As will be explained subsequently following a description of the component parts of the system in FIG. 1, the deflection yoke 17 and electron gun assembly 16 cooperate to produce acceptable convergence of the three electron beams at all points on the scanned raster without the use of additional apparatus for dynamically converging the beams or for correcting for the effects of coma.

FIG. 2 is an illustration of the predominant magnetic deflection field produced by the deflection yoke illustrated in FIG. 1. Although the horizontal and vertical field nonuniformity will vary from point to point along the longitudinal axis of the tube, the net effect of the field will be shown in FIG. 2. A deflection field for deflecting the beams in a horizontal direction, which field is produced by a pair of horizontal deflection coils, is illustrated by the solid lines of flux 21 which extend in a vertical direction. It should be noted that this magnetic field is pincushion shaped, the lines of flux being convex when viewed from the center of the figure. This horizontal deflection field produces negative horizontal isotropic astigmatism of the electron beams.

Also shown in FIG. 2 are lines of flux 22 representing a magnetic deflection field for deflecting the beams in a vertical direction, which field is produced by a pair of vertical deflection coils of deflection yoke 17. It should be noted that the vertical deflection field is generally barrel-shaped, the lines of flux being concave viewed from the center of the figure. The vertical deflection field produces positive vertical isotropic astigmatism of the beams. The purpose of producing the particular deflection fields described will be discussed in conjunction with FIG. 3.

Figure 3A:
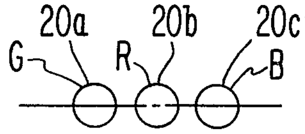
FIGS. 3a and 3b illustrate the convergence of the electron beams of the system of FIG. 1 under the influence of the deflection field of FIG. 2.
Figure 3B:
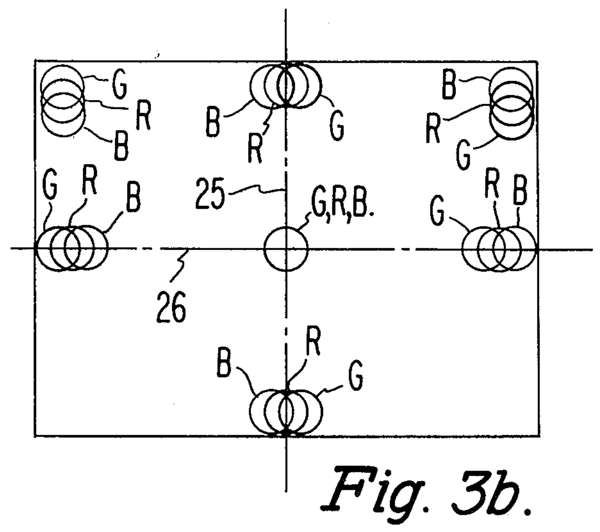

FIG. 3 illustrates the convergence of the electron beams of the system of FIG. 1 under the influence of the deflection field of FIG. 2. FIG. 3*a* illustrates the relative position of the green, red and blue beams 20*a*, 20*b* and 20*c*, respectively, as they would appear at the deflection plane (plane C in FIG. 1) of the yoke viewed from the faceplate end of the picture tube. FIG. 3*b* illustrates in exaggerated form the convergence condition of the beams in the corner of the scanned raster and along vertical and horizontal deflection axes 25 and 26 respectively. It should be noted that each electron beam illuminates several phosphor elements of a particular color at the same time. The phosphor elements are of course separated from each other but this is not shown in FIG. 3*b* which illustrates the convergence of the whole beams at various regions on the faceplate.

At the center of the raster the green, red and blue beams are converged. This center convergence is accomplished by the alignment of the beams provided by the construction of the electron gun assembly and the action of the static convergence assembly 18 shown in FIG. 1. Along the horizontal deflection axis 26 the green, red and blue beams are shown underconverged, that is, there is a separation of the beams along the horizontal axis and their order is the same as that of the beams in the deflection plane as shown in FIG. 3*a*. This condition exists at both ends of the raster along the horizontal axis. It is to be understood that the underconvergence of the beams on the horizontal axis extremities is reduced as a function of the distance from the center of the raster at which point the beams are converged. The underconvergence of the horizontal beams is caused by the particular horizontal deflection field illustrated in FIG. 2.

At the extremities of the vertical axis 25 in FIG. 3*b* the red, green and blue beams are shown overconverged, that is, the blue and green beams have crossed at some point such that at the faceplate containing the phosphor elements the blue and green beams are on opposite sides relative to their orientation at the deflection plane of the yoke. This overconvergence of the beams along the vertical axis is reduced as a function of the distance from the center of the raster at which point they are converged. The overconvergence of the beam along the vertical axis is caused by the particular vertical deflection field illustrated in FIG. 2. The convergence condition of the beams is a result of designing the deflection yoke to exhibit some negative horizontal isotropic astigmatism and some positive vertical isotropic astigmatism. Although the convergence condition in which the beams are overconverged along the vertical axis and underconverged along the horizontal axis has been illustrated, it is to be understood that other conditions of misconvergence along the axes may be utilized for producing acceptable convergence all over the raster.

It has been discovered that by proportioning the astigmatism in the deflection coils the beams can be made to substantially converge in the corners of the raster as well as at all other points of the raster as illustrated in FIG. 3*b*. The corner convergence illustrated in the upper right hand corner of the raster of FIG. 3*b* shows the blue and green beams to be slightly offset from the red beam in a vertical direction. The upper left hand corner shows the blue and green beams to be offset from the red in a direction opposite to that shown in the right hand corner. The effect of this on the raster is known as "trap," under which condition the rasters are slightly trapezoidal in shape rather than rectangular. In the past, attempts have been made to produce line-focus yokes which ideally produce convergence of the beams along the deflection axes but which generally cause an unacceptably large amount of trap in the corners, the corner convergence condition being further characterized by a horizontal separation of the beams as well as by a relatively large vertical separation.

An ideal line-focus yoke has negative horizontal isotropic astigmatism and positive vertical isotropic astigmatism. This type of astigmatism is necessary for maintaining convergence of the three horizontal in-line beams along the horizontal and vertical deflection axes. This condition of on-axis convergence would be carried into the corners of the raster and ideally result in convergence of the beams at all points on the raster. As a practical matter, it has been determined that this ideal line-focus condition can be realized only with picture tubes having a diagonal viewing screen measurement of about 14 inches or less. With picture tubes having larger viewing screen diagonal measurements a line-focus condition will not be realized and a trap condition such as described in conjunction with FIG. 3*b* will result. With trap present, the positive and negative astigmatism must be proportioned between the vertical and horizontal deflection coils by properly selecting the conductor winding distribution such that substantial convergence condition is achieved at all points on the raster.

Substantial convergence as used herein refers to a convergence condition that is commercially acceptable. It is common practice for a television receiver manufacturer to set a misconvergence limit requirement in the design specifications of a particular television receiver. It is always desirable to keep the misconvergence as close to zero as possible, but as a practical matter the manufacturing variations make zero misconvergence practically impossible to attain. A design goal set by one manufacturer is that the misconvergence of the beams measured at a distance of one half inch from edges of the scanned raster should be less than 50 mils on a picture tube having a viewing screen diagonal measurement of 15 inches. The design limit increases for large viewing screen sizes and would be about 62 mils on a picture tube having a viewing screen diagonal measurement of 25 inches.

As a practical matter the above mentioned manufacturing variations, particularly variations in the color picture tube and yoke, result in a distribution of convergence errors from one receiver to another. Many receivers will have far less error than the 50 mil design goal. On the other hand, other receivers made from the same batch of parts on the same production line will have a greater misconvergence. Receivers actually sold commercially have been found to have misconvergence errors greater than 125 mils. As used herein the term substantial convergence means a misconvergence not greater than 125 mils. The misconvergence of the beams may be observed by the separation of the ideally superimposed red, blue and green lines of a crosshatch pattern of lines appearing on the viewing screen as a suitable test signal is coupled to the television receiver. It is possible that production variations in the yokes and picture tubes, coupled with a non-optimum assembly, may result in convergence errors as large as 0.125 inches, but this condition is not encountered frequently and does not indicate that the invention has not been utilized advantageously.

The deflection yoke described here and which is described in more detail in copending application Ser. No. 217,768 entitled "Deflection Yoke For Use With In-Line Electron Guns" filed concurrently herewith for William H. Barkow et al produces a deflection field resulting in substantial convergence of the beams at all points of the raster by apportioning astigmatism between the horizontal and vertical deflection windings.

Figure 4:
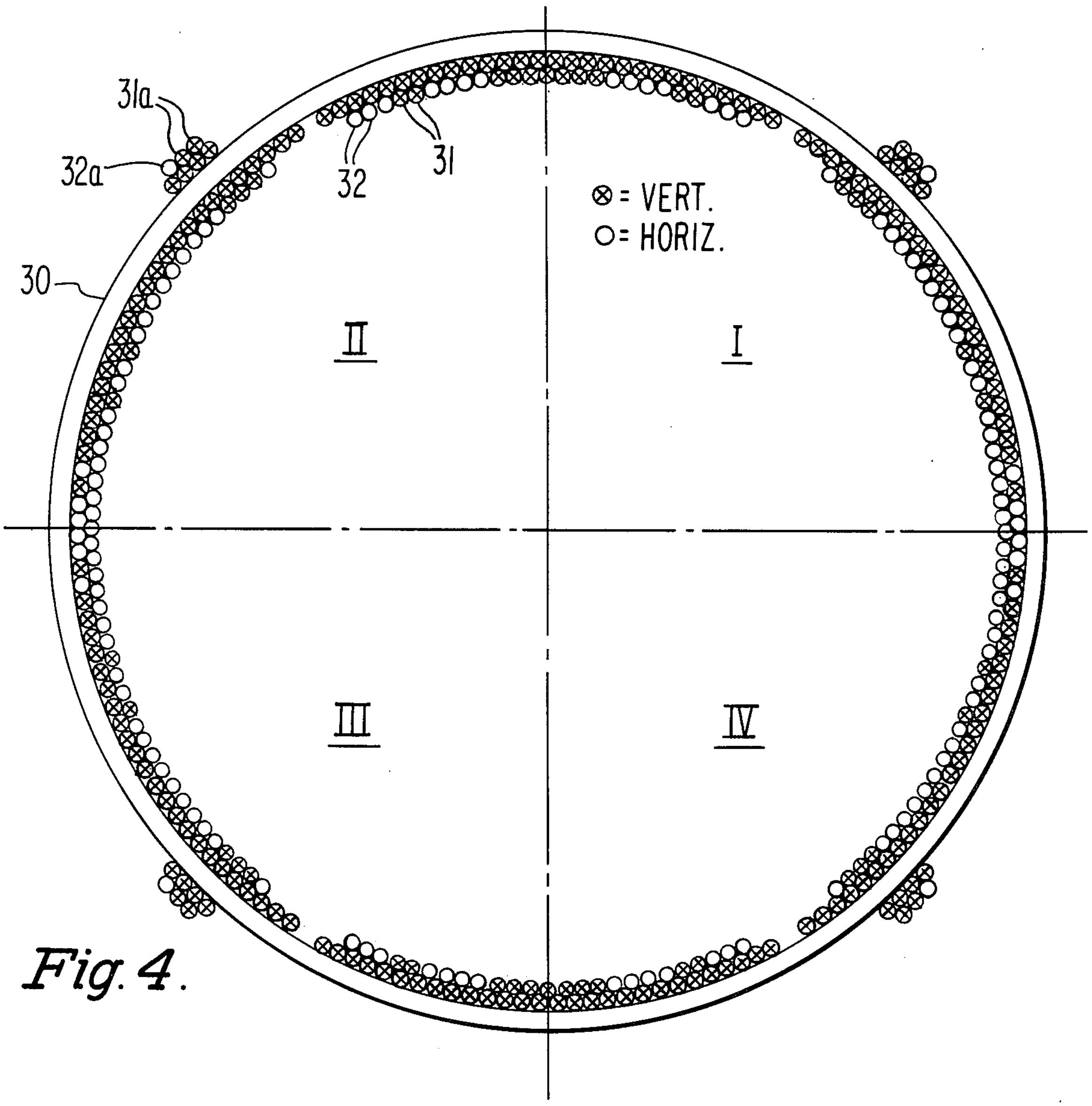
FIG. 4 illustrates the winding distribution of a toroidal deflection yoke suitable for use in the system of FIG. 1.

FIG. 4 illustrates the winding distribution of a toroidal deflection yoke suitable for producing the convergence characteristics illustrated in FIG. 3*b*. The yoke comprises conductors 31 forming a pair of vertical deflection coils and conductors 32 forming a pair of horizontal deflection coils would toroidally about a ferrite core 30. It is to be understood that the return conductors would lie along the outside of ferrite core 30.

Figure 5:
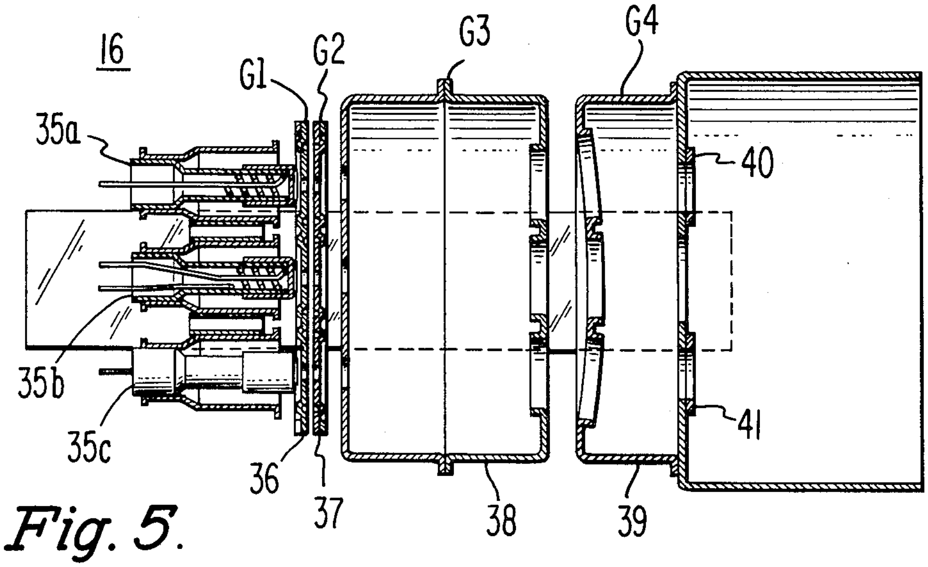
FIG. 5 illustrates an electron gun assembly suitable for use in the system of FIG. 1.

FIG. 5 illustrates an electron gun assembly 16 suitable for use in the system of FIG. 1. Three separate cathodes 35*a*, 35*b* and 35*c* are provided for generating three electron beams. The electrons emitted by the cathodes are subsequently accelerated, formed into beams and focussed by the remaining electrodes including a G1 electrode 36, a G2 electrode 37, a G3 electrode 38 and a G4 electrode 39. Although not shown, it is to be understood that the cathodes and the other electrodes are retained in their relative positions by common suitable glass beading strips attached to the various electrodes. Electron gun assembly 16 provides the three electron beams which converge at the center of the faceplate of FIG. 1 in the absence of a deflection field provided by the deflection yoke. To achieve this converged condition the alignment and spacing of the various electrodes, particularly G3 and G4, relative to each other is critical. It should be noted that all of the electrodes have three apertures and are common to the three beams. This monolithic type of construction greatly facilitates the building of a precision electron gun which produces the desired alignment of the beams particularly in the vertical direction. The spacing of the apertures in the G3 and G4 electrodes relative to each other enables the two outside beams to converge on the center beam at the viewing screen. Minor errors in beam alignment (convergence at the center of the viewing screen) are corrected by suitable adjustment of the static convergence assembly referred to above.

In larger color picture tubes, for example, such as one having a viewing screen diagonal measurement of 15 inches or larger, it may be desirable to provide coma correction such that the rasters scanned by the two outside beams are of the same size as that scanned by the central beam on the viewing screen. Coma may be exhibited by the deflection yoke and, if present, tends to become more objectionable to the viewer as the viewing screen size increases. To correct for the effects of coma, generally annular shields 40 and 41 of magnetically permeable material such as nickel-iron may be placed around the exit apertures of the G4 electrode. These shields in effect protect the two outside beams from a portion of the magnetic deflection field and thereby equalize the effect of the deflection field on the three beams such that three equal size rasters are produced. A suitable electron gun assembly of the type described is disclosed in more detail in copending application Ser. No. 217,758 filed concurrently herewith for Richard Hughes and entitled "In-Line Electron Gun For Color Picture Tube."

It has been determined that the spacing between adjacent beams in a self-converged color television display system according to the invention must be carefully selected. The minimum spacing between adjacent beams is determined by the lowest acceptable light output requirement of the picture tube. As the beams are produced with smaller and smaller spacing from each other the mask transmission must be reduced to maintain color purity. And as a consequence the result is less light output from the picture tube. This lower limit of spacing between adjacent beams for producing satisfactory brightness in a given picture tube can be calculated or determined empirically as is known in the art.

On the other hand, in accordance with one aspect of the invention there is a limit to the maximum spacing between adjacent beams. This limit is approached when the deflection yoke can no longer scan the beams with satisfactory convergence at all points on the raster.

Referring again to FIG. 1 it can be seen that the spacing between adjacent beams in a plane passing through a point C is denoted by the letter S. The letter C indicates the deflection plane of the yoke. S is measured in the deflection plane remote from the electron gun assembly, but it is to be understood that S is determined by selecting an electron gun which produces the desired spacing measured in a plane located half way along the yoke length. The relationship of S to the aperture spacing of the beam forming electrodes of the gun may be determined trigonometrically by frist measuring the distance between the apertures and the distance the yoke center is from the apertures along the path to the screen at which the beams converge. Deflection plane C is generally in a plane located half way along the longitudinal axis of the yoke at right angles thereto. The deflection yoke is mounted around the outside of the picture tube envelope with a relatively small clearance existing between the inside surface of the yoke and the glass envelope. This clearance is generally in the order of ¼ inch or less. It has been determined that the deflection yoke of the type described may be moved in directions extending perpendicular to the longitudinal axis of the picture tube for producing the best convergence of the beams. The static convergence assembly is first adjusted for producing convergence of the beams at the center of the raster. Then, the yoke is moved transversely of the picture tube until the best overall convergence is achieved on the raster. The yoke is then fixed in position by means such as a suitable mount.

In the system described the deflection yoke having the conductor distribution of the deflection winding selected for producing negative horizontal isotropic astigmatism and positive vertical isotropic astigmatism can serve to maintain the convergence of the three electron beams to a satisfactory degree as long as the S distance does not exceed 0.200 inches. Color television display systems in accordance with the invention have been successfully built utilizing picture tubes with viewing screen diagonal sizes of 15 and 17 inches and with an S spacing of 0.158 inches. Such as combination together with the slitter aperture mask also results in suitable light output of the picture tube. It has been determined that the effect of coma, i.e., unequal size different color rasters, increases proportional to the square of the S distance. This is one reason that s must not be increased to a relatively large value just to achieve greater light output from the picture tube. With an S distance not greater than 0.200 inches, it is unnecessary to correct for coma if the viewing screen diagonal measurement does not exceed 14 inches. As picture tubes with larger viewing screen sizes are utilized the effects of coma become proportionally greater and it is desirable to utilize the coma shields described in conjunction with FIG. 5. Although in the described embodiment a toroidal yoke has been described, it is to be understood that a suitable deflection yoke utilizing saddle-type coils could be utilized as well. It is known that the coma characteristics of saddle-type coils may be controlled by the distribution of the saddle-type windings at the entrance portion and middle portion of the deflection coils. Similarly astigmatism of saddle coils may be controlled by the winding distribution in the middle and exit portions of the deflection coils. In some circumstances it may be possible to eliminate the coma shields described in FIG. 5 because the come characteristics of saddle-type yokes may be controlled.

In some embodiments of the invention it may be desirable to reduce the misconvergence errors of the beams or to reduce the effects of coma by reducing the S distance between adjacent beams to the point at which the light output would be below a satisfactory level in a kinescope utilizing a viewing screen comprising fluorescent dots and a dot aperture shadow mask. In this situation the light output may be increased by utilizing a phosphor element and aperture mask arrangement as shown in FIG. 6.

Figure 6:
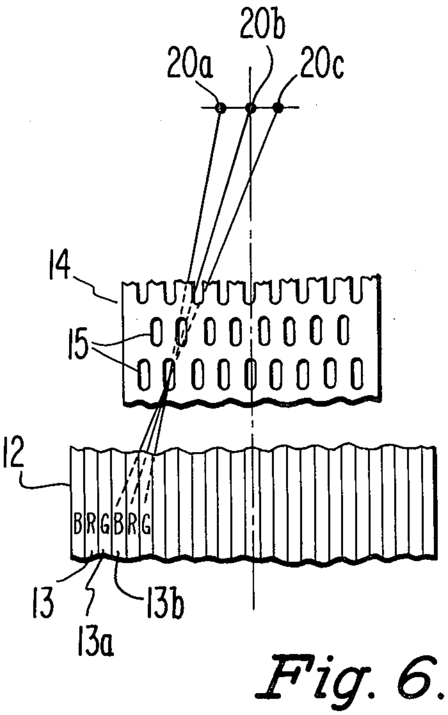
FIG. 6 illustrates an aperture mask and phosphor element screen arrangement suitable for use in the picture tube of FIG. 1.

FIG. 6 illustrates an aperture mask and phosphor element screen arrangement of the line type suitable for use in the picture tube of FIG. 1. In FIG. 6 the three electron beams 20*a*, 20*b* and 20*c* are directed through elongated aperture slits 15 in an aperture mask 14 to impinge upon respective green, red and blue phosphor elements of the line type deposited on viewing screen 12. A combination of this type, in which the slit apertures are collinear with the vertical phosphor element lines may advantageously be utilized with an electron gun of the horizontal in-line type described in conjunction with FIG. 5 because the vertical alignment of the beams is not critical. This is because the phosphor elements extend continuously in a vertical direction on the viewing screen and there is no need to critically control the vertical tolerance of the beams because they will always land on the desired color in a vertical direction. Thus, the elongated slit apertures 15 in aperture mask 14 permit more of the beams to pass than the corresponding dot apertures used in conjunction with a viewing screen having dot phosphor elements. The result of the higher mask transmission in the elongated slit aperture-vertical phosphor element arrangement of FIG. 6 is to increase the light output of the picture tube, thereby enabling a relatively small S distance of the beams to be utilized to achieve substantial convergence of the electron beams when scanned by the deflection yoke described above. Unlike its delta gun counterpart, the in-line electron gun assembly used in the combination according to the invention does not require dynamic convergence and hence does not result in beam trio degrouping, i.e., enlargement of the beam trio spacing as the beams are deflected from the center of the raster. Thus, the lensing for the printing of the phosphor elements is simplified.

The disclosed system has the advantageous feature of not requiring dynamic correction for misconvergence and the effects of coma. Since misconvergence and the effects of coma increase as the viewing screen size is increased, the invention may be advantageously utilized with in-line gun color picture tubes having viewing screen diagonal measurements of 23 and 25 inches. However, under these circumstances it may be desirable to supplement the self-convergence features with a simplified dynamic convergence apparatus. Such a scheme might utilize electrostatic or electromagnetic convergence means disposed in the neck region of the picture tube energized at only one of the line and field scanning rates. For example, the use of only horizontal dynamic convergence correction with a horizontal in-line electron gun assembly as described above would result in a raster in which the beams are satisfactorily converged at all points.

What is claimed is:

1. A color television display system, comprising:

a color television picture tube including a face-plate having deposited thereon groups of three different color phosphor elements forming a viewing screen, an electron beam gun assembly for producing three horizontal in-line electron beams lying in a plane substantially normal to said viewing screen and an aperture mask including a plurality of apertures in registry with said groups of phosphor elements, said electron beam gun assembly being selected for producing said three beams along three generally convergent lines extending toward the center of said viewing screen; and a deflection yoke comprising vertical and horizontal deflection coils disposed around said picture tube between said mask and said gun assembly for deflecting said beams for forming a raster on said viewing screen, the winding distribution of said deflection coils being selected for producing vertical positive isotropic astigmatism and negative horizontal isotropic astigmatism such that said beams are overconverged at the ends of the vertical axis of the raster and underconverged at the ends of the horizontal axis thereof;

said electron beam gun assembly including beam forming members for producing a spacing not greater than 0.200 inches between adjacent ones of said beams meaured in a plan located halfway between the ends of said yoke when said beams are substantially at the center of said screen.

2. A color television display system according to claim 1 wherein said electron gun assembly includes at least one common beam forming electrode having three apertures for said beams.

3. A color television display system according to claim 2 wherein said electron gun assembly includes shield members disposed around the path of the two outside ones of said three beams for shielding said two beams from a portion of said deflection field.

4. A color television display system according to claim 3 wherein said electron gun beam forming members produce a spacing between adjacent beams in said deflection plane of substantially 0.158 inches when said beams are substantially at the center of said viewing screen.

5. A color television display system, comprising:

a color television picture tube including a faceplate having deposited thereon repeating groups of three different color phosphor elements, said elements being in the form of parallel strips forming a viewing screen, an electron beam gun assembly for producing three horizontal in-line electron beams lying in a plane substantially normal to said viewing screen and normal to the direction of said phosphor strips and, an aperture mask including a plurality of elongated slit apertures extending collinearly with said phosphor strips and in registry with said groups of phosphor elements, said electron beam gun assembly being selected for producing said three beams along three generally convergent lines extending toward the center of said viewing screen; and a deflection yoke comprising vertical and horizontal deflection coils disposed around said picture tube between said mask and said gun assembly for deflecting said beams for forming a raster on said viewing screen, the winding distribution of said deflection coils being selected for producing vertical positive isotropic astigmatism and negative horizontal isotropic astigmatism for overconverging the beams at the ends of the vertical deflection axis and underconverging the beams at the ends of the horizontal deflection axis;

said electron beam gun assembly including beam forming members for producing a spaced not greater than 0.200 inches between adjacent ones of said beams measured in a plane located halfway between the ends of said yoke when said beams are substantially at the center of said viewing screen.

6. A color television display system according to claim 5 wherein said electron gun assembly includes at least one common beam forming electrode having three apertures for said beams.

7. A color television display system according to claim 6 wherein said electron gun assembly includes shield members disposed around the path of the two outside ones of said three beams for shielding said two beams from a portion of said deflection field.

8. A color television display system, comprising:

a color television picture tube including a faceplate having deposited thereon groups of three different color phosphor elements forming a viewing screen, an electron beam gun assembly for producing three horizontal in-line electron beams lying in a plane substantially normal to said viewing screen and an aperture mask including a plurality of apertures in registry with said groups of phosphor elements, said electron gun assembly being selected for producing said three beams along three generally convergent lines extending toward the center of said viewing screen; and a deflection yoke comprising vertical and horizontal deflection coils disposed around said picture tube between said mask and said gun assembly for deflecting said beams for forming a raster on said viewing screen, the winding distribution of said deflection coils being selected for producing vertical positive isotropic astigmatism and negative horizontal isotropic astigmatism for overconverging the beams at the ends of the vertical deflection axis and for underconverging the beams at the ends of the horizontal deflection axis;

said electron beam gun assembly including at least one common beam forming electrode having three apertures therein and including beam forming members for producing a spacing not greater than 0.200 inches between adjacent ones of said beams measured in a plane halfway between the ends of said yoke when said beans are substantially at the center of said viewing screen such that said beams are substantially converged at all points on said raster.

9. A color television display system, comprising:

a color television picture tube including a faceplate having deposited thereon groups of three different color phosphor elements forming a viewing screen, an electron beam gun assembly for producing three horizontal in-line electron beams lying in a plane substantially normal to said viewing screen and an aperture mask including a plurality of apertures in registry with said groups of phosphor elements, said electron beam gun assembly being selected for producing said three beams along three generally convergent lines extending toward said viewing screen; and a deflection yoke comprising vertical and horizontal deflection coils disposed around said picture tube between said mask and said gun assembly for deflecting said beams for forming a raster on said viewing screen, the winding distribution of said deflection coils being selected for producing vertical positive isotropic astigmatism and negative horizontal isotropic astigmatism for overconverging the beams at the ends of the vertical deflection axis and for underconverging the beams at the ends of the horizontal deflection axis;

said electron gun including beam forming members for producing a spacing between adjacent ones of said beams not greater than 0.200 inches measured in a plane located halfway between the ends of said yoke when said beams are substantially at the center of said viewing screen;

said electron gun further including shield members disposed around the outside two of said three beams for shielding said two beams from a portion of said deflection field such that all three of said beams scan substantially equal size rasters, and whereby all of said beams are substantially converged at all points on said raster.

10. A color television display system, comprising:

a color television picture tube including a faceplate having deposited thereon groups of three different color phosphor elements forming a viewing screen, an electron beam gun assembly for producing three horizontal in-line electron beams lying in a plane substantially normal to said viewing screen and an aperture mask including a plurality of apertures in registry with said groups of phosphor elements; and a deflection yoke comprising vertical and horizontal deflection coils disposed around said picture tube between said mask and said gun assembly for deflecting said beams for forming a raster on said viewing screen, the winding distribution of said deflection coils being selected for apportioning the astigmatism produced by the coils such that said beams are overconverged at the ends of the vertical axis of the raster ans substantially converged at all points of the raster, said electron beam gun assembly including beam forming members for producing a spacing not greater than 0.200 inches between adjacent ones of said beams measured in a plane located halfway between the ends of said yoke when the beams are substantially at the center of said viewing screen.

11. A color television display system according to claim 10 wherein said electron gun assembly includes at least one common beam forming electrode having three apertures for said beams.

12. A color television display system according to claim 11 wherein said electron gun assembly includes shield members disposed around the path of the two outside ones of said three beams for shielding said two beams from a portion of said deflection field.

13. A color television display system according to claim 12 wherein said electron gun beam forming members produce a spacing between adjacent beams in said deflection plane of substantially 0.158 inches when said beams are substantially at the center of viewing screen.

14. A color television display system, comprising:

a color television picture tube including a faceplate having deposited thereon repeating groups of three different color phosphor elements, said elements being in the form of parallel strips forming a viewing screen, an electron beam gun assembly for producing three horizontal in-line electron beams lying in a plane substantially normal to said viewing screen and normal to the direction of said phosphor strips and, an aperture mask including a plurality of elongated slit apertures extending collinearly with said phosphor strips and in registry with said groups of phosphor elements; and a deflection yoke comprising vertical and horizontal deflection coils disposed around said picture tube between said mask and said gun assembly for deflecting said beams for forming a raster on said viewing screen, the winding distribution of said deflection coils being selected for producing vertical positive isotropic astigmatism and negative horizontal isotropic astigmatism such that said beams are substantially converged at all points on said viewing screen;

said electron beam gun assembly including beam forming members for producing a spacing not greater than 0.200 inches between adjacent ones of said beams measured in a plane located halfway between the ends of said yoke when said beams are substantially at the center of said screen.

15. A color television display system according to claim 14 wherein said winding distribution of said coils is selected such that said horizontal negative isotropic astigmatism and said vertical positive isotropic astigmatism produces underconvergence of said beams at the ends of the horizontal deflection axis and substantial convergence of said beams at all points of the raster.

16. A color television display system according to claim 15 wherein said electron gun assembly includes at least one common beam forming electrode having three apertures for said beams.

17. A color television display system according to claim 16 wherein said electron gun assembly includes shield members disposed around the path of the two outside ones of said three beams for shielding said two beams from a portion of said deflection field.

18. A color television display system, comprising:

a color television picture tube including a faceplate having deposited thereon groups of three different color phosphor elements forming a viewing screen, an electron beam gun assembly for producing three horizontal in-line electron beams lying in a plane substantially normal to said viewing screen and an aperture mask including a plurality of apertures in registry with said groups of phosphor elements; and a deflection yoke comprising vertical and horizontal deflection coils disposed around said picture tube between said mask and said gun assembly for deflecting said beams for forming a raster on said viewing screen, the winding distribution of said deflection coils being selected for producing vertical positive isotropic astigmatism and negative horizontal isotropic astigmatism;

said electron beam gun assembly including at least one common beam forming electrode having three apertures therein and including beam forming members for producing a spacing not greater than 0.200 inches between adjacent ones of said beams measured in a plane halfway between the ends of said yoke when said beams are substantially at the center of said viewing screen such that said beams are substantially converged at all points on said raster.

19. A color television display system, comprising:

a color television picture tube including a faceplate having deposited thereon groups of three different color phosphor elements forming a viewing screen, an electron beam gun assembly for producing three horizontal in-line electron beams lying in a plane substantially normal to said viewing screen and an aperture mask including a plurality of apertures in registry with said groups of phosphor elements; and a deflection yoke comprising vertical and horizontal deflection coils disposed around said picture tube between said mask and said gun assembly for deflecting said beams for forming a raster on said viewing screen, the winding distribution of said deflection coils being selected for producing vertical positive isotropic astigmatism and negative horizontal isotropic astigmastism;

said electron gun including beam forming members for producing a spacing between adjacent ones of said beams not greater than 0.200 inches measured in a plane located halfway between the ends of said yoke when said beams are converged at the center of said viewing screen;

said electron gun further including shield members disposed around the outside two of said three beams for shielding said two beams from a portion of said deflection field such that all three of said beams scan substantially equal size rasters, and whereby all of said beams are substantially converged at all points on said raster.

20. A color television display system, comprising:

a color television picture tube including a faceplate having deposited thereon groups of three different color phosphor elements forming a viewing screen, an electron beam gun assembly for producing three horizontal in-line electron beams lying in a plane substantially normal to said viewing screen and an aperture mask including a plurality of apertures in registry with said groups of phosphor elements; and a deflection yoke comprising vertical and horizontal deflection coils disposed around said picture tube between said mask and said gun assembly for deflecting said beams for forming a raster on said viewing screen, the winding distribution of said deflection coils being selected for apportioning the astigmatism produced by the coils such that said beams are underconverged at the ends of the horizontal axis of the raster and substantially converged at all points of the raster, said electron beam gun assembly including beam forming members for producing a spacing not greater than 0.200 inches between adjacent ones of said beams measured in a plane located halfway between the ends of said yoke when the beams are substantially at the center of said viewing screen.

* * * * *